(12) United States Patent
Mateer et al.

(10) Patent No.: US 8,184,794 B1
(45) Date of Patent: May 22, 2012

(54) DO NOT CALL REGISTRY DATABASE ACCESS SYSTEM

(75) Inventors: Michael T. Mateer, Omaha, NE (US);
Kenneth J. Belfrage, Omaha, NE (US);
Chad David Hendren, Missouri Valley, IA (US)

(73) Assignee: West Corporation, Omaha, NE (US)

( * ) Notice: Subject to any disclaimer, the term of this patent is extended or adjusted under 35 U.S.C. 154(b) by 877 days.

(21) Appl. No.: 12/239,873

(22) Filed: Sep. 29, 2008

Related U.S. Application Data

(60) Provisional application No. 60/977,408, filed on Oct. 4, 2007.

(51) Int. Cl.
*H04M 3/42* (2006.01)
*H04M 1/56* (2006.01)
*H04M 15/06* (2006.01)

(52) U.S. Cl. ......... 379/210.02; 379/142.01; 379/142.04; 379/142.06; 379/211.01

(58) Field of Classification Search ............ 379/210.02, 379/142.02, 196, 201.01, 211.01, 142.06, 379/142.01, 142.04; 370/352, 389; 455/415, 417, 414.1

See application file for complete search history.

(56) References Cited

U.S. PATENT DOCUMENTS

| | | | |
|---|---|---|---|
| 7,099,444 B1 * | 8/2006 | Russell | 379/142.02 |
| 2002/0136379 A1 * | 9/2002 | Fleischer et al. | 379/196 |
| 2006/0280165 A1 * | 12/2006 | Blumenschein et al. | 370/352 |
| 2008/0259918 A1 * | 10/2008 | Walker et al. | 370/389 |

* cited by examiner

*Primary Examiner* — Thjuan K Addy

(57) ABSTRACT

An apparatus and method for providing users operating on Signaling System No. 7 (SS7) networks with the ability to interconnect with Advance Intelligent Networking (AIN) and, in particular, to provide database lookup for the Do Not Call (DNC) Registry, without requiring users to implement complex and expensive systems in their network. An Intelligent Call Management (ICM) structure receiving information of a dialed toll number is able to convert the information into a compatible database request to determine whether the call to the toll number is allowed to be completed based on information retrieved from the database.

20 Claims, 3 Drawing Sheets

DO NOT CALL REGISTRY DATABASE ACCESS SYSTEM

CROSS REFERENCE TO RELATED APPLICATIONS

The present application claims priority from U.S. Provisional Patent Application No. 60/977,408, filed on Oct. 4, 2007, entitled NATIONAL DO NOT CALL REGISTRY DATABASE ACCESS VIA SS7 QUERIES.

FIELD OF THE INVENTION

The present invention is related to the Do Not Call Registry and more specifically to an improvement in the manner in which businesses are able to determine whether a particular potential customer has listed their telephone number on the Do Not Call Registry.

BACKGROUND OF THE INVENTION

Signaling System No. 7 (SS7) is a global standard for telecommunications. The standard defines the procedures and protocol by which network elements in the public switched telephone network (PSTN) exchange information over a digital signaling network to effect wireless (cellular) and wired call setup, routing and control. The SS7 network and protocol are used for, among others, basic call setup and toll-free (800/888) and toll (900) wired services.

Due to potential liability for placing calls to numbers on the Do Not Call Registry, the easy and inexpensive determination of whether a particular number is on the Do Not Call Registry has become a priority to businesses and an economic burden to small business entities due to complex adaptations previously required to their SS7 networks. Prior solutions to the problem of obtaining phone numbers on the Registry involved obtaining outdated lists or developing complex internal networking adaptations to connect to the list which often involved checking a number prior to calling or cross-checking a series of numbers. These solutions were either time consuming or expensive or both.

SUMMARY OF THE INVENTION

It is an object of the present invention to provide an improved system and method whereby a business is able to use an ordinary phone connection with a standard common signaling system protocol, i.e. Signaling System No. 7 (SS7), to place a call to a phone number and be assured that if the call goes through it is not a number on the Do Not Call Registry.

It is a further object to provide database lookups to entities who do not have resources to develop comparable systems.

In accordance with the present invention third party provided SS7 networking can be used to incorporate into a system that provides Advanced Intelligent Networking (AIN) solutions.

As a further advantageous element of the present invention, standard signaling system protocol and equipment can be used to initiate inquiries to a database and obtain a result via the same signaling system protocol and equipment.

DETAILED DESCRIPTION OF THE PREFERRED EMBODIMENT

Figure 1:
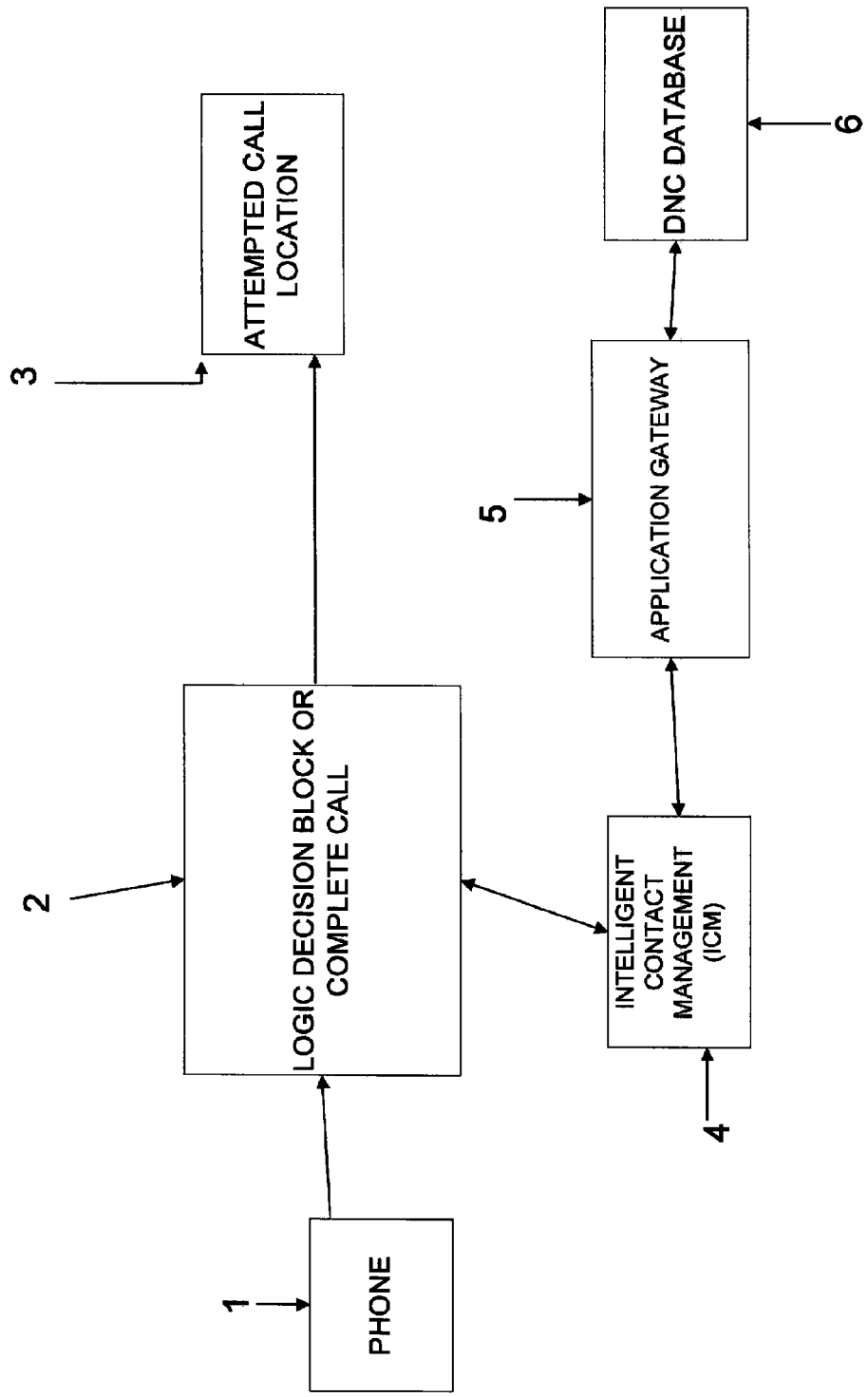
FIG. 1 is a system diagram illustrating the operation of the present invention.

As shown in FIG. 1, the system and method allows for a business entity or customer to use the interconnected networking to provide Advanced Intelligent Networking solutions and particularly, in this instance the ability to query the database of the Do Not Call Registry. In order to initiate operation a business entity that desires to make a connection to a phone number for solicitation purposes dials the toll number from phone 1. The call proceeds to a Decision logic 2 that allows for either blocking or completing of the call. Control of the decision to block or allow the call is provided by the Intelligent Contact Management (ICM) 4. The process for making the decision to block or allow the call begins by passing the dialed toll number, the Caller Entered Digits (CED), and the Automatic Number Identification (ANI) to the ICM 4. Based on the Dialed Number, ICM 4 runs a routing script to perform a request to the Application Gateway 5, which, in turn, forms an SQL (Structured Query Language) Statement, using the ANI/Dialed Number, to address the DNC (Do Not Call) Database 6.

The response from the DNC Database 6 is sent via Application Gateway 5. In turn the ICM 4 via script logic confirms whether the call number is okay to dial. Thus ICM 4 returns a label to the ss7 network Decision Logic 2, that, if validated to either block or allow to dial and proceeds according with the call. That is, if Label is validated as Okay the call is placed to a phone location 3. On the other hand, the call is blocked if the Label is a blocking Label.

Figure 2:
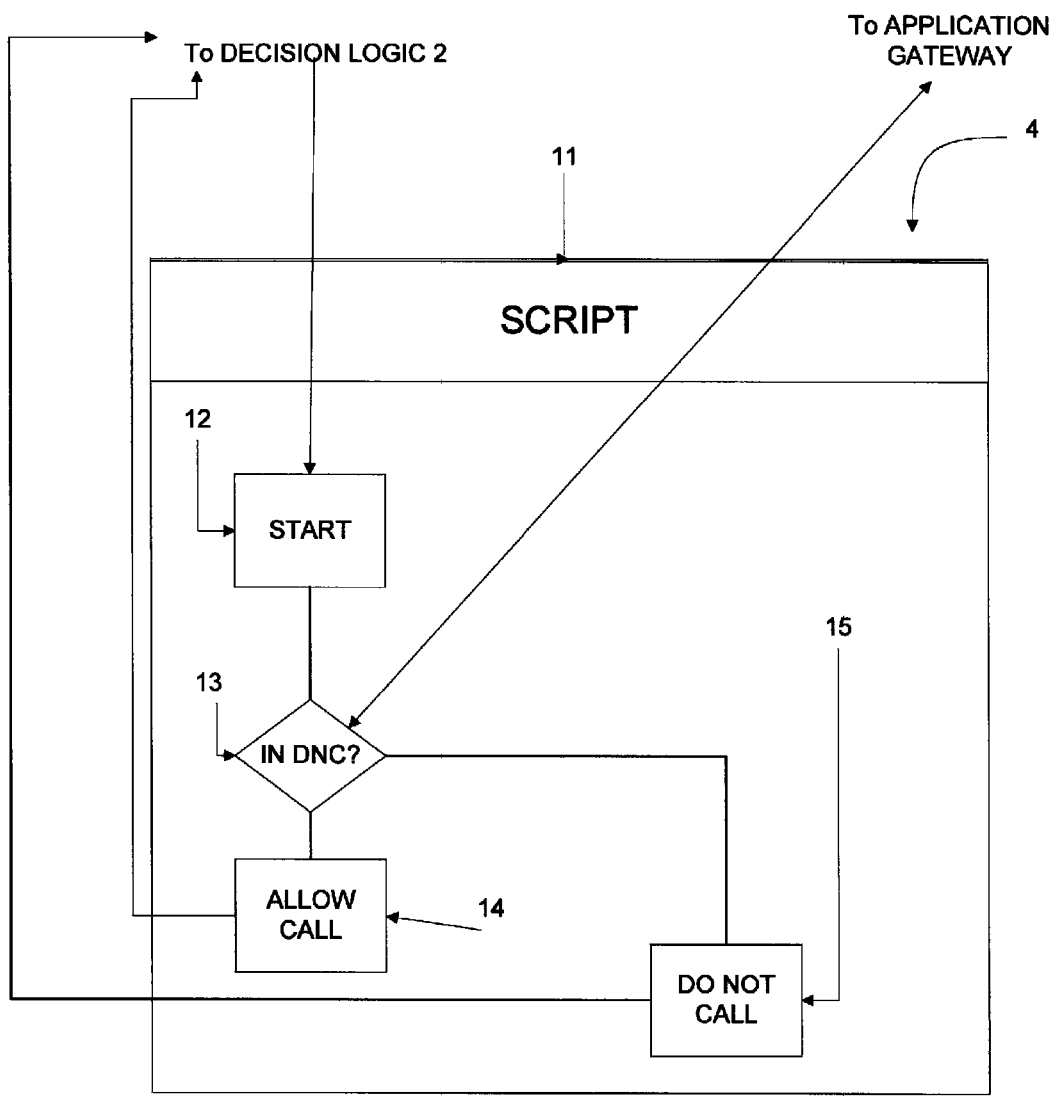
FIG. 2 is a schematic of an Intelligent Call Management (ICM) according to the present invention.

The structure of the ICM 4 that provides interface between the ss7 networking associated with phone 1 and the Do Not Call. Database 6 is shown in FIG. 2. The dialed call generated by phone 1 is passed to the ICM 4 which, using the dialed number, the Called Entered Digits (CED) and/or the Automatic Number Identification (ANI), runs a routing script 11 necessary for the Application Gateway 5 to the START 12. Using the request generated by the routing script, Decision Gate 13 queries the DNC by way of the Application Gateway 5. At this point the Application Gateway is now able to form an SQL (Structured Query Language) statement to the DNC 6. The response from the DNC 6 contains the necessary information to determine whether the call from phone 1 may be placed. It is then necessary to have the script interpret, based on information returned from the Application Gateway 5, whether the number can be called. The Script provides an Allow call 14 Label or a Do Not Call 15 Label which is passed back to the SS7 Decision Control Logic 2.

Figure 3:
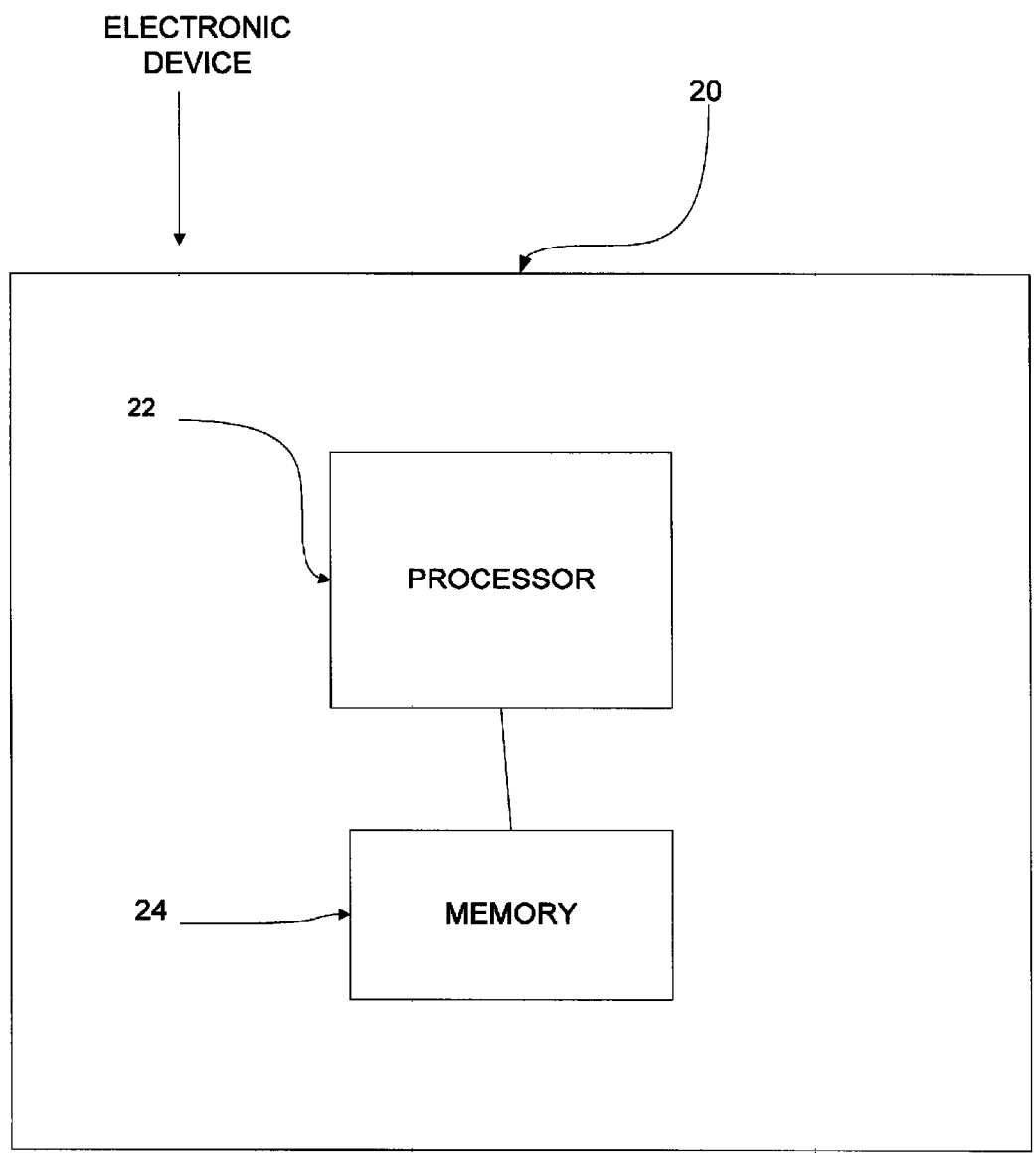
FIG. 3 is a schematic of an electronic device for performing the improved method of the present invention.

The electronic device 20 of FIG. 3 shows a configuration which may be used to perform the method of the present invention. The device includes the processor 22 and memory 24 which can be configured to determine whether a dialed toll number from a PSTN phone using a Standard Signaling No. 7 (SS7) protocol network based signaling will be allowed to be completed. The electronic device 20 may be a portable or fixed device, whether functioning by itself or as part of a more complex system or as part of system accomplishing multiple different functions, which includes a processor 22 and memory 24 to accomplish the described method of database lookup to determine whether to allow or block a dialed phone number.

With this system, parties using SS7 Networking are able to interconnect with and have solutions from Advanced Intelligent Networking (AIN) such as the Do Not Call Registry interconnection.

Obviously, numerous additional modifications and variations of the present invention are possible in light of the above teachings, It is therefore to be understood that, within the scope of the appended claims, the invention may be practiced otherwise than as specifically described herein.

What is claimed is:

1. A system for providing advanced intelligent networking solutions to users of a PSTN networking having a Signaling System No. 7 (SS7) networking protocol in order to determine completion or blocking of dialed phone numbers, comprising:
   a logic decision module for connection to a phone on a network using the Signaling System No. 7 (SS7) protocol; and
   a call management device connected to said logic decision module for receiving first information concerning a phone number dialed at said phone and communicating with an external database to provide second information to said logic decision module as a function of a relationship between said phone number dialed and data in said external database, wherein said second information provided to said logic decision module determines the completion or blocking of said dialed phone number.

2. The system according to claim 1, wherein said logic decision module determines whether said dialed call is to be completed as a function of said first information.

3. The system according to claim 1, wherein said external database is a Do Not Call Registry.

4. The system according to claim 1, wherein the call management device runs a routing script as a function of at least one of the Dialed Number and caller entered digits and automatic number identification.

5. The system according to claim 4 further including an application gateway connected between said call management device and said external database.

6. The system according to claim 5, wherein said application gateway provides a sequence query logic statement in response to a request resulting from the running of the routing script by said call management device.

7. The system according to claim 6, wherein said external database receives said sequence query statement and outputs a response back to said application gateway and wherein said routing script confirms whether said sequence query logic statement allows completion of said dialed number.

8. The system according to claim 7, wherein said call management system provides said confirmation from said routing script as said information to said logic decision module.

9. A method of determining whether dialed toll numbers from a PSTN phone using a Signaling System No. 7 (SS7) protocol network based signaling will be allowed to be completed, comprising the steps:
   outputting information concerning a dialed toll number to a logic decision module and a call management device;
   running a routing script by means of said call management device as a function of said outputted information to form a request to an external database;
   receiving a response from said external database to said request wherein said response contains data indicating whether said dialed toll number is allowed to be completed; and
   preparing confirmation of said data by means of said script and providing a signal compatible with said SS7 protocol to said logic decision module to control blocking or completion of said dialed toll number.

10. The method according to claim 9 further comprising the step of providing a Sequence Query Logic Statement as a function of said outputted information and said routing script in order to prepare said request to said external database.

11. The method according to claim 10 wherein said external database is a Do Not Call Registry.

12. The method according to claim 9 wherein said information concerning said dialed toll number includes at least one of the dialed number and caller entered digits and automatic number identification.

13. The method according to claim 10 further including providing an Application Gateway for communication between said call management device and said external database wherein said sequence query logic statement is prepared by said Application Gateway.

14. The method according to claim 9 wherein said signal compatible with said SS7 protocol network is a Label to be validated by said SS7 protocol network.

15. Apparatus for providing database lookup for operators of a system using Signaling System 7 (SS7) protocol networks in order to determine whether to block or allow completion of dialed phone numbers, comprising:
   a logic module having a first input configured to receive information concerning a dialed toll phone number and a second input configured to receive Signaling System 7 (SS7) protocol network compatible information for blocking or completing the dialed phone number; and
   an advanced intelligent network compatible structure configured to communicate with an external database, said structure including a call management device configured to convert said information concerning said dialed toll phone number into a database query compatible with said external database.

16. The apparatus according to claim 15, wherein said external database is a Do Not Call Registry.

17. The apparatus according to claim 15, wherein said advanced intelligent network runs a routing script as a function of at least one of the dialed number and caller entered digits and automatic number identification.

18. The apparatus according to claim 17, further including an application gateway connected between said call management device and said external database.

19. The apparatus according to claim 18, wherein said application gateway provides a sequence query logic statement in response to a request resulting from the running of the routing script.

20. The apparatus according to claim 18, wherein said external database receives said sequence query statement and outputs a response back to said application gateway and wherein said routing script confirms whether said sequence query logic statement allows completion of said dialed toll phone number.

* * * * *